United States Patent [19]

Pfaff

[11] Patent Number: 4,622,776
[45] Date of Patent: Nov. 18, 1986

[54] HANGING PLANTER

[75] Inventor: Peter R. Pfaff, North Arlington, N.J.

[73] Assignee: Missry Associates, Inc., Dunellen, N.J.

[21] Appl. No.: 753,891

[22] Filed: Jul. 11, 1985

[51] Int. Cl.⁴ .............................................. A01G 9/02
[52] U.S. Cl. ........................................................ 47/67
[58] Field of Search .............. 47/67, 84, 71; 220/375, 220/94 A; 24/16 PB, 455; 248/74.3

[56] References Cited

U.S. PATENT DOCUMENTS

| 888,349 | 5/1908 | Ogden | 248/74.3 |
| 3,314,194 | 4/1967 | Hallack | 47/84 |
| 4,138,803 | 2/1979 | Sherlock | 47/67 |
| 4,520,926 | 6/1985 | Nelson | 220/375 |

FOREIGN PATENT DOCUMENTS

| 2748732 | 5/1979 | Fed. Rep. of Germany | 47/84 |
| 967076 | 3/1964 | France | 220/94 A |

Primary Examiner—Robert A. Hafer
Assistant Examiner—Bradley M. Lewis
Attorney, Agent, or Firm—Bauer & Amer

[57] ABSTRACT

A hanging planter having a pot and separate stringers for suspension. The pot is formed with at least a pair of loops integral with its lips into which the stringers are held for transportation, display, and storage.

6 Claims, 5 Drawing Figures

HANGING PLANTER

BACKGROUND OF THE INVENTION

The present invention is directed to a hanging planter and particularly to a planter of the type adapted to be hung pendulously from a ceiling, wall, or the like.

Planters of the foregoing type are used generally as holders for growing plants, cut flowers and the like, in homes, terraces and other usually non-garden areas. As such, they are formed to be decorative as well as of light weight. Such planters are preferably of molded plastic material and comprise a lower section in the shape of pot or bowl, having an upper edge of lip from which a suspension assembly having a plurality of stringers extend upwardly and are joined to a common hook member. At first, the stringers of the suspension assembly were integrally formed with the pot section, being welded or molded therewith during the manufacturing process. Such construction insured that the material and decorative aspects of both the pot section and the stringers of the suspension assembly conformed to each other. This form of construction proved disadvantageous in that it made shipping and storage difficult and expensive, because when so constructed it was difficult to stack one planter within another, and separate boxing and shipping containers were required.

Because of economic and space considerations, it has recently become acceptable to form the pot section and the stringer suspension assembly separately, providing cooperating means on the lip of the pot and on the end of the stringers whereby they may be joined immediately prior to use. This, however, has its own disadvantages during manufacturing, storage, transportation, and sale, in that great care and attention must be paid to producing exact numbers of pots and stringer suspension assemblies of comparable design and number and to the boxing and shipping of exact sets.

A particular problem arises at the point of sale, where great care must be taken when planters are placed in the open for display and for handling by the retail customers. While savings have been obtained in transport and storage of separable pot sections and stringer suspension assemblies, the increased cost, often far exceeding the savings, incurred due to separation and pilfered and lost stringer assemblies, customer returns based on non-conforming stringer assemblies and pots, and the return of incomplete sets has resulted in excessive loss of profit to both retailer and manufacturer.

It is an object of the present invention to insure by a simple and inexpensive method, the provision of complete sets of hanging planters including conforming pot and stringer suspension assemblies during all stages in the chain of wholesale and retail distribution.

It is a specific object of the present invention to provide means whereby the separable stringer suspension assembly is carried by and attached thereof directly with the specific pot to which it conforms.

Above all, it is an object of this invention to reduce the cost of distribution and sale, and thereby reduce the ultimate cost of the planters of the type described.

These objects and advantages as well as others will be apparant from the following disclosure of the present invention.

SUMMARY OF THE INVENTION

According to the present invention, a hanging planter having a pot and a suspension assembly adapted to be removably attached to the pot is provided with the improvement whereby the suspension assembly is engagingly held to and attached with and to the pot in an inoperative but combined form for distribution, storage, and display, and from which attachment and holder, it can be easily removed and thereafter secured in operative positive to the pot to suspend or hang the planter.

The invention is carried out by providing the pot with a plurality attachment means in the form of loops integrally formed with the pot, more easily with the lip of the pot and relatively spaced about the periphery thereof, into which the elongated stringers of a totally separate suspension assembly are placed and securely held. In one specific form, the attachment means comprises flexible straps integrally attached at one end and bendable into a loop, having its free end removably inserted into a hole in the pot or in the lip. In another embodiment, the attachment is a loop formed on the lip. In either case the attachment means may be removable, in toto, so that it may be discarded, if desired.

Full details of the invention are illustrated in the accompanying drawing and described in detail in the following description.

DESCRIPTION OF THE INVENTION

Figure 1:
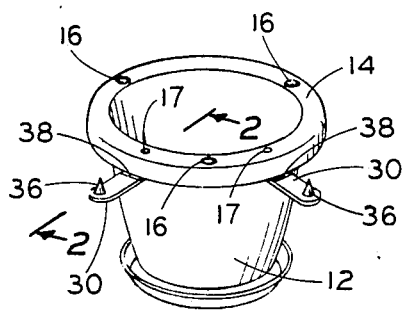
FIG. 1 is a perspective view of a planter showing a strap form of attachment means constructed according to the teaching of the invention.

As seen in FIGS. 1-4, the present invention is applied to an otherwise conventional planter 10, comprising a pot 12 of the usual deep bowl construction into which a plant, in a ceramic or clay flower pot or without such pot may be inserted. The pot section 12 is provided with a radially extending peripheral lip 14 about its open edge in which a plurality of holes 16 are uniformly spaced. The planter includes a suspension assembly generally identified 18, comprising a plurality of stringers 20, generally conforming in number to the number of holes 16. The stringers 20 are integrally joined to a common hook 22 at one end and are provided at their free ends with annular flanges 24 which can be force fitted respectively through and into the holes 16, and which once so inserted can not be easily withdrawn.

The holes 16 may be formed of any desired configuration as seen in FIG. 1, by incising the material of the lip 14 in a cross 26 flaps 28 are provided which are movable on the entering of the flanges 24 of the stringers 20 into the hole to allow the flange 24 to pass therethrough, but which spring back to hold the flange against the lower surface of the lip 14. The flanges 24 instead of being annular may be in the shape of barbs, hooks, or the like, and the holes conformingly incised. The holes 16 may be in the form of narrow notches cut into the peripheral edge of the lips, thus facilitating entry of the stringers. When placed in use, the weight of the pot 12 incidental to suspension causes the flanges 24 to coact with the holes or notches creating a strong connection between the suspension assembly and the pot.

Further detail of the planter construction, are not vital to a presentation of the present invention and are therefore not set forth herein. Reference to various known and commercial forms of planters and separate suspension assemblies can be made for such details.

According to the embodiment of FIGS. 1 to 4 of the present invention, a pair of elongated flexible straps 30 are movably provided on the pot 12 preferably on the periphery of the lip 14 of the pot 12. The straps are integrally attached at one end 32 to the lip, although they could be attached to other parts of the pot 12, and are provided at their other ends 34 with a securement or engagement means 36 which releasably engages or fits into a hole 17 formed in the lip 14. The engagement means 36 may be of any desired construction or configuration. In the drawing it is illustrated simply as a conical protrusion that enables its pointed end to enter the hole 17 so its larger diameter may be securely pressed into holding engagement with the wall of the hole. When desired, the barb 36 can be pulled free of the hole to release its engagement.

Figure 3:
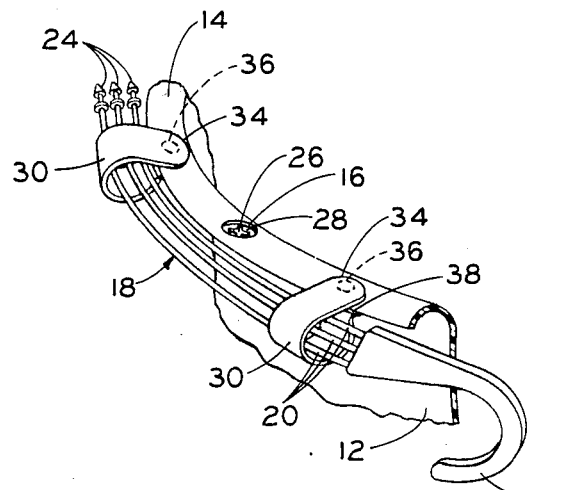
FIG. 3 is a perspective view of a portion of a planter pot showing its suspension assembly engaged therewith by a plurality of attachment straps in accord with the present invention.
Figure 2:
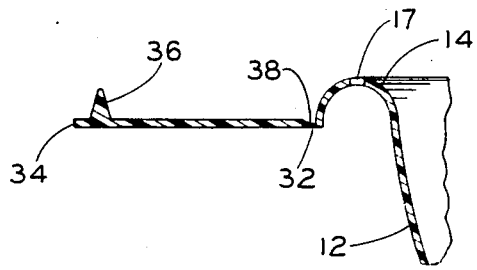
FIG. 2 is a cross-sectional view taken along lines 2—2 of FIG. 1.
Figure 4:
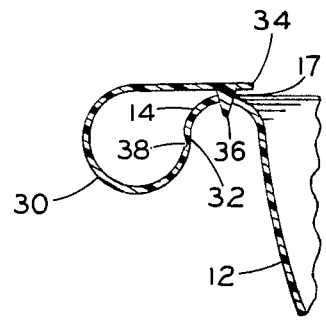
FIG. 4 is a similar view to FIG. 2, showing the creation of the loop.
Figure 5:
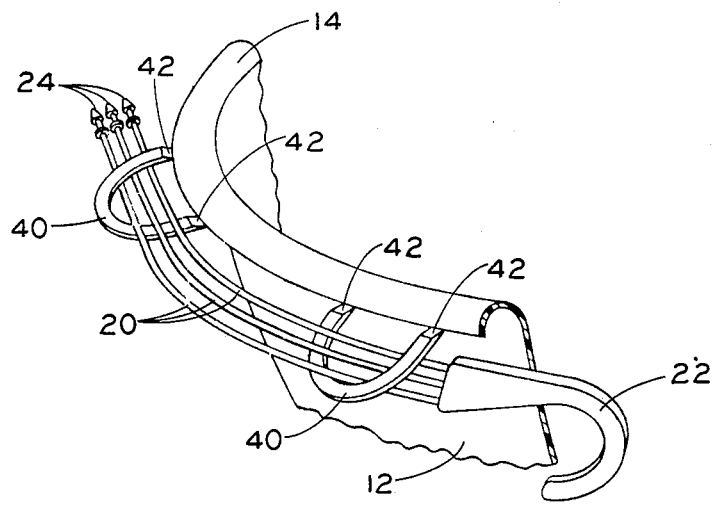
FIG. 5 is a perspective view of another closed loop embodiment of the attachment means for holding the suspension assembly.

Preferably, the hole 17 is of sufficient size to receive the barb 36 and releasably retain the strap 30 in its loop form as shown in FIGS. 3 and 4. The straps 30 have a length that when bent to insert the barb 36 into the hole 17 and held at each end, are capable of forming a loop surrounding and holding the suspension assembly 18. In practice, the hole 17 can be slotted to receive the whole end of the strap and a small barb 36 therethrough for releasable engagement therewith.

The straps 30 are spaced a distance from each other sufficient to allow the suspension assembly 18 to be held adjacent each of its ends in a substantially taut manner concentrically about the lip of the pot. In this manner, a suspension assembly conforming in decoration exactly to the pot can be assembled with the pot so that they can be transported together in an individual box or by stacking several planters with other planters in a common box each with its own attached suspension assembly 18. During transport, display and, in fact, in all conditions of distribution the proper suspension assembly 18 and pot 12 will remain attached and assembled together.

The ultimate purchaser desiring to hang the planter pot 12 merely removes the strap 30 and its engaging barb 36 of the free end 34 from the hole 17 freeing the suspension assembly 18. The flanged ends 24 of the stringers 20 are inserted into the appropriate holes 16. The straps 30 may be removed from the pot section 12 at their thinned or narrowed weakened connections 38 by tearing the straps 30 free at their inner ends 32. On the other hand, the straps 30 may be left still attached to the lip 16 so that it may be used, once again, in the event the purchaser wishes to store the pot, as for example, through the winter, without losing the suspension assembly 18. In practice, the strap 30 may be molded sufficiently thin that it may be torn or otherwise easily separated from the pot without resorting to the provision of the weakened or thinner connections 38.

In FIG. 4 another embodiment can be seen in which rather than providing the separable elongated straps 30, a pair of completed flexible attachment loops 40 of generally U-shape are attached at each end 42 to the peripheral edge of the lip 14. The loops are thus arranged substantially coplanar with the lip edge and are preferably of such size that they may be flexed and twisted to accommodate the assembling receipt therein and the removal therefrom of the suspension assembly 18. Like the straps 30 shown earlier, the loops 40 may be removable, by providing similar points of attachment 42 to the lip 14 as described. Once again the narrowing or thinning of the points of attachment 42 may not be necessary when the loops 40 are sufficiently thin to enable them to be separated readily from the pot.

Since the planter is formed of molded plastic, the simultaneous integral, monolithic molding of either the straps 30 to loops 40 can be performed in a single step without adding little if anything to the cost or complexity of its construction.

In either embodiment, a simple inexpensive way of insuring the maintenance of conforming pots and stringers assembly is provided. Loss at any stage of distribution or sale is reduced and the objects of the present invention are fully met.

What is claimed is:

1. In a hanging planter of the type comprising a pot section and a separable suspension assembly having a plurality of stringers adapted to be secured to the peripheral edge of said pot section, the improvement to said planter comprising a lip on said pot section and an attachment means integral with said lip and having flexible means thereon releasably engageable with said pot section for enclosing and for holding said suspension assembly to said pot section in an inoperative position along a side of said pot section and comprising a plurality of said releasably engageable attachment means on said pot section at spaced intervals about and along a side of said pot section and in which said suspension assembly is inserted and releasably held in an inoperative position alongside said pot section as a part thereof and against accidental separation from said pot section to discourage pilferage and separation therefrom.

2. An improved planter as claimed in claim 1, wherein said lip is generally horizontally extending the open edge of said pot section.

3. An improved planter as claimed in claim 2, wherein said suspension assembly comprises relatively movable string-like support means for vertically suspending said planter, and wherein said attachment means are releasably attachable with said pot section for strapping said relatively movable support means of said suspension assembly together to said lip of said pot section to retain them attached thereto and said string-like support means are fixedly engaged to said pot section.

4. The improved planter according to claim 2, wherein said attachment means are releasable loops each formed of a flexible strap integrally attached at one end to the lip of said planter and releasably engageable with said lip whereby said strap surrounds and attaches said suspension assembly to said pot section.

5. The improved planter according to claim 2 wherein said attachment means are flexible closed loops each integrally forming a part of said lip and each having an opening sufficient to permit entry of said suspension assembly therethrough to retain said suspension assembly attached to said pot section.

6. The improved planter according to claim 1, said attachment means being of flexible material and being separable from said pot section after said suspension assembly is removed from engagement thereby with said pot section and supports said pot section in suspension.

* * * * *